(12) United States Patent
Brück et al.

(10) Patent No.: US 10,927,948 B2
(45) Date of Patent: Feb. 23, 2021

(54) DEVICE FOR DETECTING THE POSITION OF A GEAR STEP SELECTOR LEVER

(71) Applicant: Küster Holding GmbH, Ehringshausen (DE)

(72) Inventors: Joachim Brück, Hohenahr (DE);
Michael Nicodemus, Herborn (DE);
Tobias Eichenauer, Lahnau (DE);
Heiko Schirmer, Herborn (DE);
Wolfgang Pätzold, Northeim (DE);
Evelyn Vorländer, Herborn (DE);
Viktor Kremer, Biebertal (DE)

(73) Assignee: KÜSTER HOLDING GMBH, Ehringshausen (DE)

( * ) Notice: Subject to any disclaimer, the term of this patent is extended or adjusted under 35 U.S.C. 154(b) by 134 days.

(21) Appl. No.: 15/579,962

(22) PCT Filed: Jun. 8, 2016

(86) PCT No.: PCT/EP2016/063073
§ 371 (c)(1),
(2) Date: Dec. 6, 2017

(87) PCT Pub. No.: WO2016/198476
PCT Pub. Date: Dec. 15, 2016

(65) Prior Publication Data
US 2018/0238440 A1 Aug. 23, 2018

(30) Foreign Application Priority Data
Jun. 9, 2015 (DE) .................. 10 2015 109 104.6

(51) Int. Cl.
*F16H 59/04* (2006.01)
*F16H 59/02* (2006.01)
(Continued)

(52) U.S. Cl.
CPC ....... *F16H 59/044* (2013.01); *F16H 59/0204* (2013.01); *F16H 59/105* (2013.01); *G01D 5/145* (2013.01)

(58) Field of Classification Search
CPC . F16H 59/02024; F16H 59/044; F16H 59/105
(Continued)

(56) References Cited

U.S. PATENT DOCUMENTS

| 7,614,319 B2 | 11/2009 | Herrnansson |
| 8,863,603 B2 | 10/2014 | Patzold |

(Continued)

FOREIGN PATENT DOCUMENTS

| CN | 101925760 A | 12/2010 |
| CN | 104179955 A | 12/2014 |

(Continued)

OTHER PUBLICATIONS

Notice of Grounds for Rejection in respect of JP Patent Application No. 2017-561368 dated Aug. 20, 2019.
(Continued)

*Primary Examiner* — Joseph Brown
(74) *Attorney, Agent, or Firm* — Rogowski Law LLC

(57) ABSTRACT

The invention relates to a device for detecting the position of a gearshift lever for selecting a gear/driving stage or a gear setting of a motor vehicle. The device has a signal transmitter installed on the gearshift lever and a signal receiver installed at a distance from the signal transmitter, wherein it is possible to detect the different positions of the signal transmitter relative to the signal receiver in different gears or gear settings. The invention further relates to a motor vehicle having such a device.

10 Claims, 6 Drawing Sheets

(51) Int. Cl.
*F16H 59/10* (2006.01)
*G01D 5/14* (2006.01)

(58) Field of Classification Search
USPC ........................................................ 74/473.18
See application file for complete search history.

(56) References Cited

U.S. PATENT DOCUMENTS

| | | | |
|---|---|---|---|
| 9,303,756 | B2 | 4/2016 | Yamamoto |
| 9,677,665 | B2 | 6/2017 | Patzold |
| 2004/0035237 | A1 | 2/2004 | Matsui |
| 2005/0028634 | A1 | 2/2005 | Giefer |
| 2008/0041182 | A1 | 2/2008 | Giefer |
| 2010/0294067 | A1 | 11/2010 | Bak |
| 2016/0123460 | A1* | 5/2016 | Tsukazaki ........... F16H 59/0204 74/473.23 |
| 2017/0191561 | A1* | 7/2017 | Seibold ................ F16H 59/105 |
| 2017/0321798 | A1* | 11/2017 | Fribus .................. F16H 59/105 |
| 2019/0145510 | A1* | 5/2019 | Moreno Colom .. F16H 59/0204 74/473.3 |

FOREIGN PATENT DOCUMENTS

| | | | | |
|---|---|---|---|---|
| DE | 10231015 | A1 | 3/2004 | |
| DE | 102006021078 | B3 | 8/2007 | |
| DE | 602004009929 | T2 | 8/2008 | |
| DE | 102009015883 | A1 * | 10/2010 | ........... F16H 59/105 |
| DE | 102014017480 | | 3/2015 | |
| JP | 2007062664 | A | 3/2007 | |
| JP | 2007099258 | A * | 4/2007 | ........... F16H 59/105 |
| JP | 2011-015168 | A | 6/2011 | |
| JP | 2007-062664 | A | 3/2015 | |

OTHER PUBLICATIONS

English translation of Search Report issued by State Intellectual Property Office of the People's Republic of China in respect of CN 201680034012.3, dated Feb. 19, 2019.

\* cited by examiner

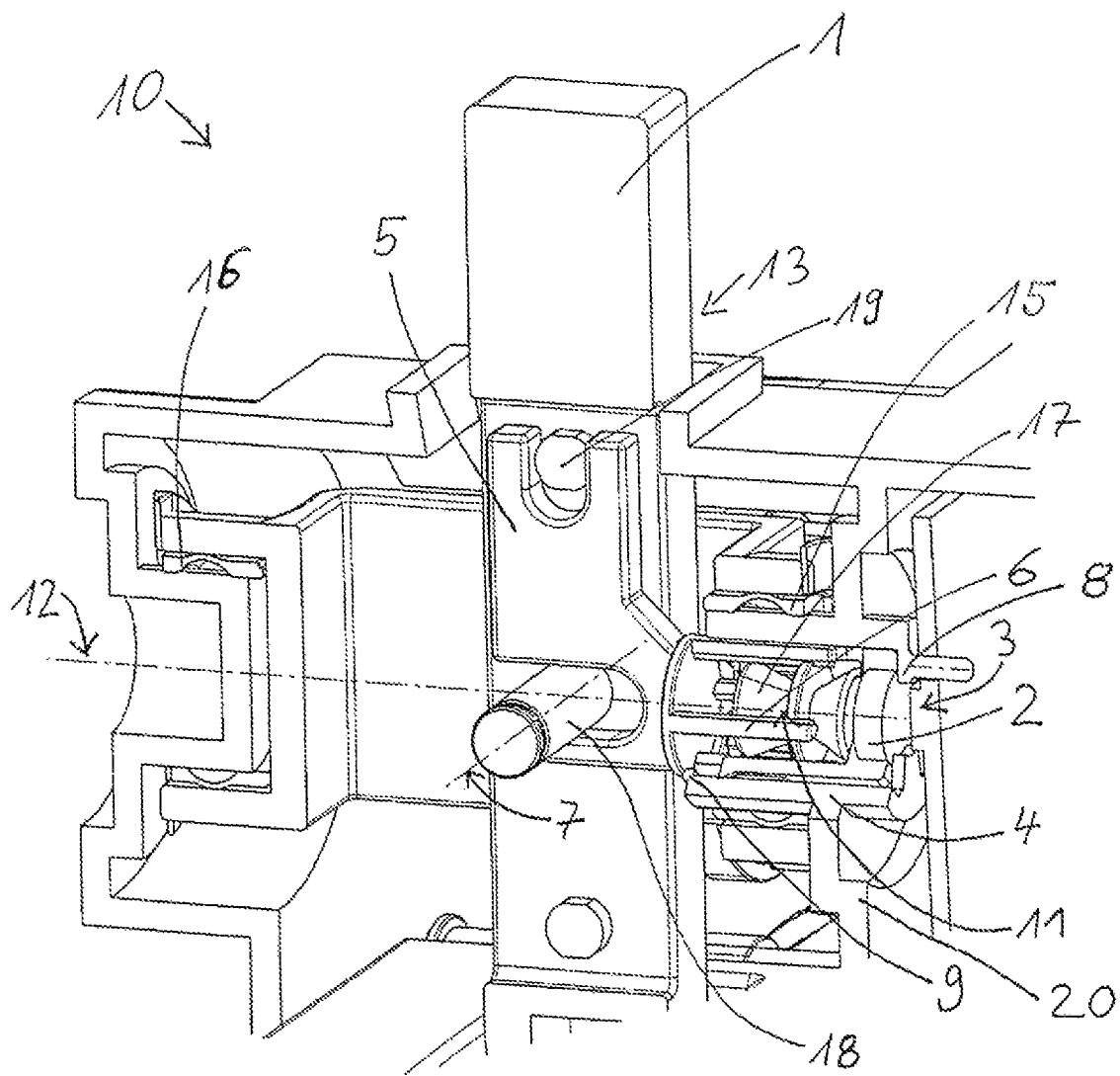
FIG.: 1

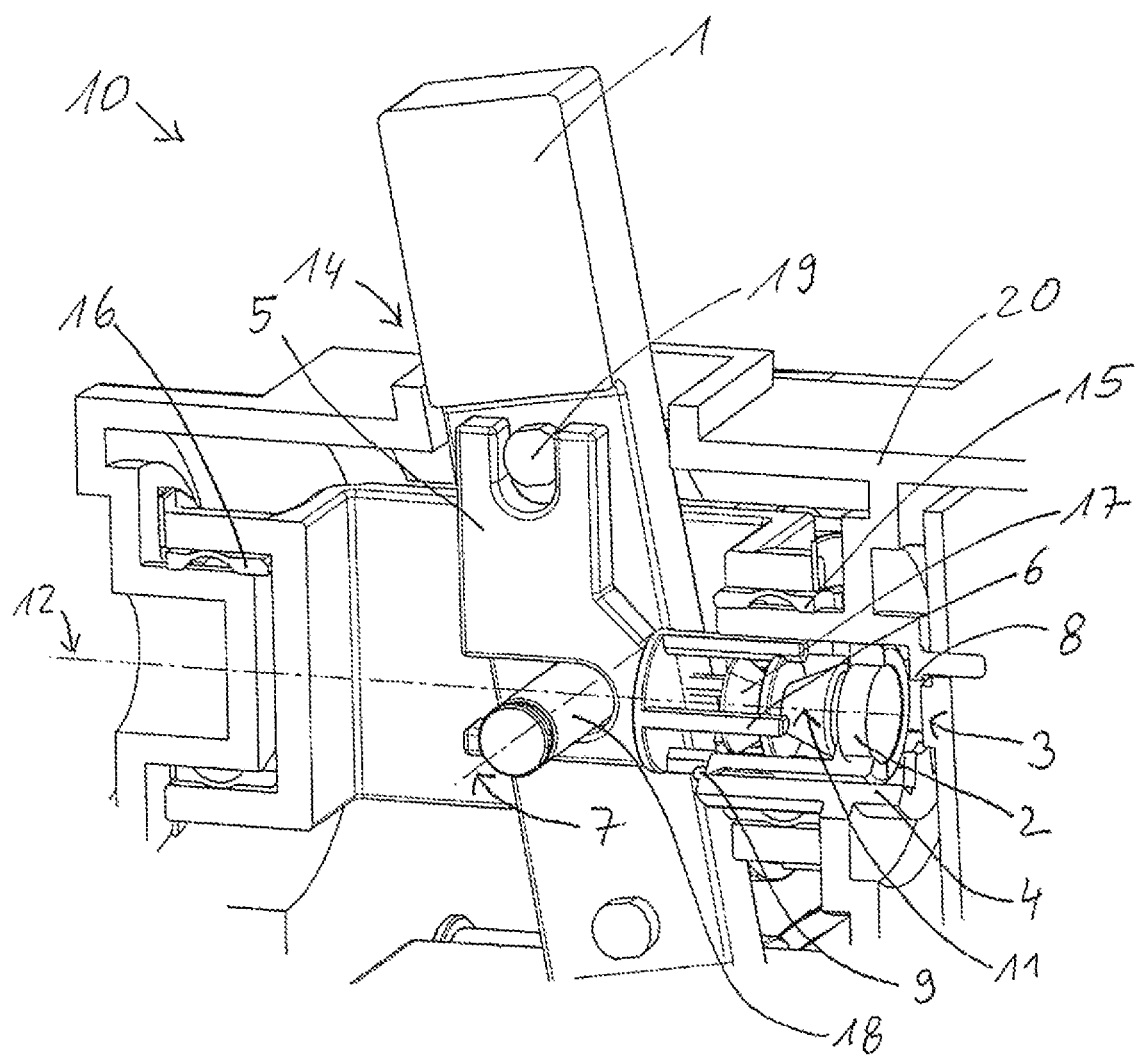
FIG.: 2

FIG.: 3
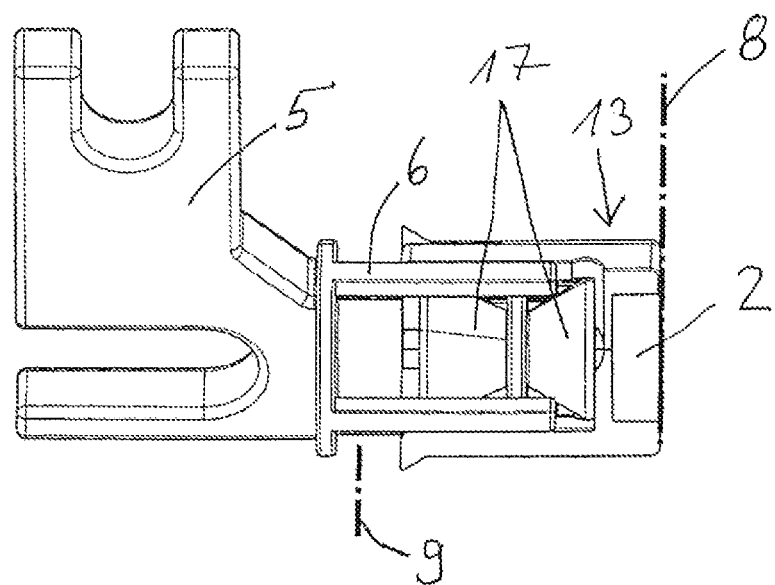
FIG.: 4
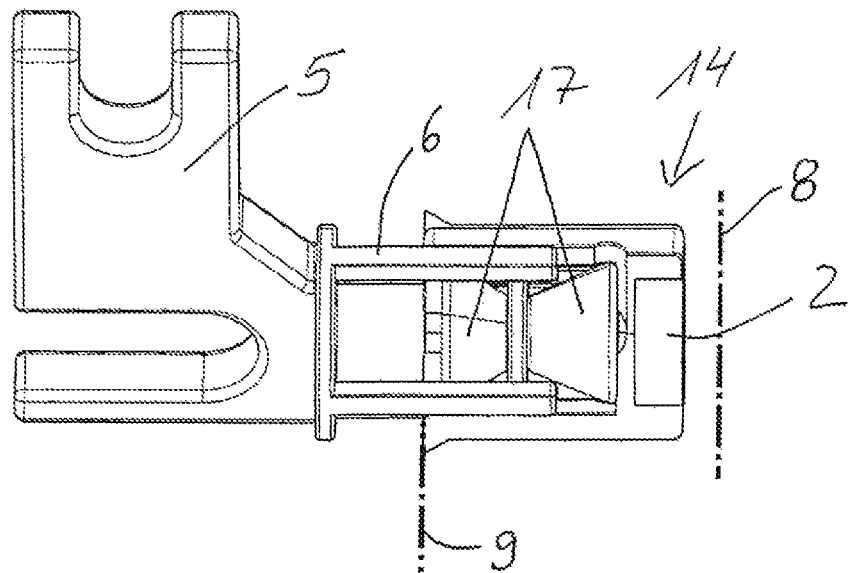

DEVICE FOR DETECTING THE POSITION OF A GEAR STEP SELECTOR LEVER

CROSS-REFERENCE TO RELATED APPLICATIONS

This application is a national stage application (under 35 USC § 371) of PCT/EP2016/063073, filed Jun. 8, 2016, which claims benefit of German application No. 10 2015 109 104.6, filed Jun. 9, 2015, the contents of each of which are incorporated by reference herein.

BACKGROUND OF THE INVENTION

Technical Field and State of the Art

The invention relates to a device for detecting the position of a gearshift lever that serves to select a gear or gear setting of a motor vehicle. The device has a signal transmitter installed on the gearshift lever and a signal receiver installed at a distance from the signal transmitter, whereby it is possible to detect the different positions of the signal transmitter relative to the signal receiver in different gears or gear settings. The invention also relates to a motor vehicle having such a device.

Devices of the above-mentioned type are known from the state of the art. Automatic transmissions as well as semiautomatic transmissions of motor vehicles are typically actuated without a direct mechanical coupling between the gearshift lever and the transmission. In these so-called "shift-by-wire" systems, the position of the gearshift lever is detected and, on the basis of the actual position of the gearshift lever, the desired gear or desired gear setting is ascertained, which is then set, for instance, by means of auxiliary motors in the transmission.

German patent application DE 10 2009 015 883 A1 discloses a device for detecting the position of a gearshift lever. A sensor for detecting the relative position of a magnet arranged on the gearshift lever is configured for three dimensions. The sensor is configured as a 3D Hall sensor. The gearshift lever is arranged on a support frame so as to pivot in two directions. A north-south axis of the magnet is configured pair-wise perpendicular to the pivoting axes. When the gearshift lever is moved, the magnetic field originating from the magnet rotates together with the magnet. The Hall sensor registers this change in the magnetic field. The position of the gearshift lever can be unambiguously determined on the basis of the magnetic field strength as well as on the basis of the magnetic field direction.

German patent application DE 102 31 015 A1 discloses a device for converting a biaxial pivoting movement of a shifting lever into a planar movement of a shifting lever position transmitter. A first pivoting axis of the shifting lever is formed by a bearing bolt. Two additional bolts are installed at two opposing places on the holder, whereby the axis of symmetry of the bolts forms a shared second pivoting axis for the shifting lever. A shifting lever position transmitter is formed by an articulated element having a mounting receptacle in which an actuator is installed.

A drawback of the state of the art is that, when the gearshift lever is pivoted, the magnet makes a movement along the arc of a circle. The magnetic field of the magnet that is moved along the arc of a circle is weak, especially in the edge area of the movement. As a result, the components of the direction vectors of the magnetic field are imprecisely detected by the sensor, which leads to an erroneous detection of the position of the gearshift lever.

Before this backdrop, an objective of the invention is to improve a device of the above-mentioned type in such a way that the position of a gearshift lever can be detected precisely and with a high degree of reliability.

SUMMARY OF THE INVENTION

A device according to an embodiment of the invention for detecting the position of a gearshift lever that serves to select the gear setting of a motor vehicle has at least one signal transmitter arranged on the gearshift lever as well as at least one signal receiver arranged at a distance from the signal transmitter. The position of the signal transmitter relative to the signal receiver is different in the various selectable gears and can be detected by the signal transmitter and the signal receiver.

As set forth in the present application, the term "gearshift lever" should be understood to refer to any device which can be manually actuated and with which at least two different gears of the transmission of a motor vehicle can be selected. In this context, the type of transmission does not play a role for the invention. The transmission can be an automatic transmission or a semi-automatic transmission as well as a conventional manual transmission.

According to an embodiment of the invention, it is provided that, when the gearshift lever is actuated in order to switch over from a shift gate function to a touch shift gate function or vice versa, the signal transmitter only executes a translatory movement relative to the signal receiver. This is particularly advantageous since the signals emitted by the signal transmitter, for example, a magnet, or else the direction vectors of the magnetic field are reliably detected by the receiver during a translatory movement relative to the signal receiver and can thus be further processed.

In the prior-art systems, when the gearshift lever is pivoted, the magnet makes a movement along an arc of a circle, with the result that, especially in the outer measuring area, the direction vectors of a very weak magnetic field can reach the signal receiver. This subsequently causes erroneous detections and thus an incorrect position determination of the gearshift lever. This problem is avoided according to the invention, thereby ensuring reliable and thus secure shifting operations.

A first refinement of the invention provides that the signal transmitter is installed so that it can move in a linear guide. In this manner, the signal transmitter is guided in a precisely oriented manner, and the signals can be precisely detected by the signal receiver. In particular, for example, the use of a magnet as the signal transmitter makes it possible to select the components of the magnetic field as the signal, whereby said components can be exactly detected. Imprecise measurements or even a failure of the detection due to signals that are too weak or even absent can be prevented.

According to an alternative embodiment, an actuation element is provided to transmit the movement of the gearshift lever to the signal transmitter, and this actuation element engages with the gearshift lever outside of its tilting axis. The movement of the gearshift lever causes the actuation element to change the position of the signal transmitter relative to the signal receiver. A tilting movement of the gearshift lever is converted into a translatory movement of the signal transmitter. The actuation element effectuates a precise translatory movement of the signal transmitter. The fact that the actuation element is engaged outside of the tilting axis of the gearshift lever ensures a precise measurement, since even in the case of small tilting movements of the selector lever, the translatory engagement of the actuation element accounts for a larger stroke and thus a pronounced translatory movement of the signal transmitter, thus yielding precisely measurable changes in the signal, especially changes in the magnetic field.

When it comes to the design and assembly, it is particularly advantageous for the signal transmitter to be accommodated in a receptacle that is operatively connected to the actuation element. The receptacle can be configured, for example, as a cage.

In a refinement of the invention, the signal transmitter is integrated into the actuation element. For example, the signal transmitter can be injection-molded onto the actuation element or else part of the actuation element can be injection-molded around it. This is done, for example, in the form of a plastic injection molded part using insert or outsert technology.

The configuration of the receptacle as a cage brings about a reduction of the weight of the components, while also achieving a sturdy design, which, especially in the automotive realm, plays a crucial role in terms of saving fuel and/or electric energy during the operation of the motor vehicle.

According to a refinement of the invention, the linear movement of the signal transmitter is limited by two stops that protect the device from being mechanically overloaded. This is so because the movement path of the signal transmitter is limited and, as a result, even in case of a vigorous movement of the gearshift lever, the stressed components cannot be mechanically overloaded.

According to an alternative embodiment, it can be provided that the signal transmitter is resiliently accommodated in the receptacle or in the cage. In this manner, the device is protected against mechanical overload when the signal transmitter is moved counter to an elastic recovery force. Without such a resilient receptacle, the signal transmitter can be moved against the stops without being braked, as a result of which the signal transmitter itself as well as the interacting components are exposed to severe mechanical stress, which can cause a great deal of strain and thus shorten the service life or even destroy the components.

According to another alternative embodiment, it is provided that, in order to allow a pivoting movement to be made perpendicular to the tilting axis of the gearshift lever, the receptacle for the signal transmitter has a cylindrical configuration, whereby the cylinder axis coincides with the pivoting axis for the pivoting movement of the gearshift lever. The device for detecting the position of the gearshift lever can be configured in such a way that, when the selector lever is pivoted in the lengthwise direction of the vehicle along the pivoting axis, the individual gears (P, N, R, D) can be shifted up or down by hand. In case of a tilting movement along the tilting axis, a switchover can be made from a shift gate function to a touch shift gate function or vice versa, so that the individual gears can be shifted up or down. As an alternative, it can also be provided that the functions can be actuated in the corresponding opposite direction relative to the vehicle.

Owing to the symmetrical configuration of the receptacle as a cylinder, it is possible for the axis of symmetry or cylindrical axis to coincide with the pivoting axis, thereby achieving a more compact installation size and greatly simplifying the assembly of the device, which results in cost savings in the production process.

In a refinement of the invention, at least one bearing is provided in order to achieve a smooth pivoting movement of the gearshift lever perpendicular to the tilting axis.

According to an alternative embodiment, when it comes to the design and assembly, it is particularly advantageous for the at least one bearing to be formed by the bearing of the receptacle. Thanks to the dual function as a receptacle for the signal transmitter and as a bearing, the production costs as well as the total weight of the device can be reduced.

According to another embodiment of the invention, the resilient elements located on the receptacle return the gearshift lever from a pivoted position into a position for normal driving operation.

The invention also encompasses so-called mono-stable gearshift levers that, after being deflected, for example, by elastic return elements, are returned to a mono-stable position.

An independent idea of the invention relates to a motor vehicle having a device according to the invention described above.

Another independent idea of the invention is that the entire shifting device can be installed in a vehicle so as to be rotated by 180°, especially in a right-hand drive vehicle. Here, the function and the operation in terms of the shifting function between a main gate or shift gate and a touch shift gate are retained.

DESCRIPTION OF THE DRAWINGS

Additional objectives, advantages, features and application possibilities of the present invention can be gleaned from the description below of an embodiment making reference to the drawing. In this context, all of the described and/or depicted features, either on their own or in any meaningful combination, constitute the subject matter of the present invention, also irrespective of their compilation in the claims or in the claims to which they refer back.

The following is shown:

FIG. 1 a possible embodiment of a device according to the invention, in a perspective view with a gearshift lever in the normal position;

FIG. 2 the device according to FIG. 1, with a gearshift lever in the deflected position;

FIG. 3 a position of a signal transmitter, in a perspective view;

FIG. 4 another position of the signal transmitter according to FIG. 3;

DETAILED DESCRIPTION

Figure 5:
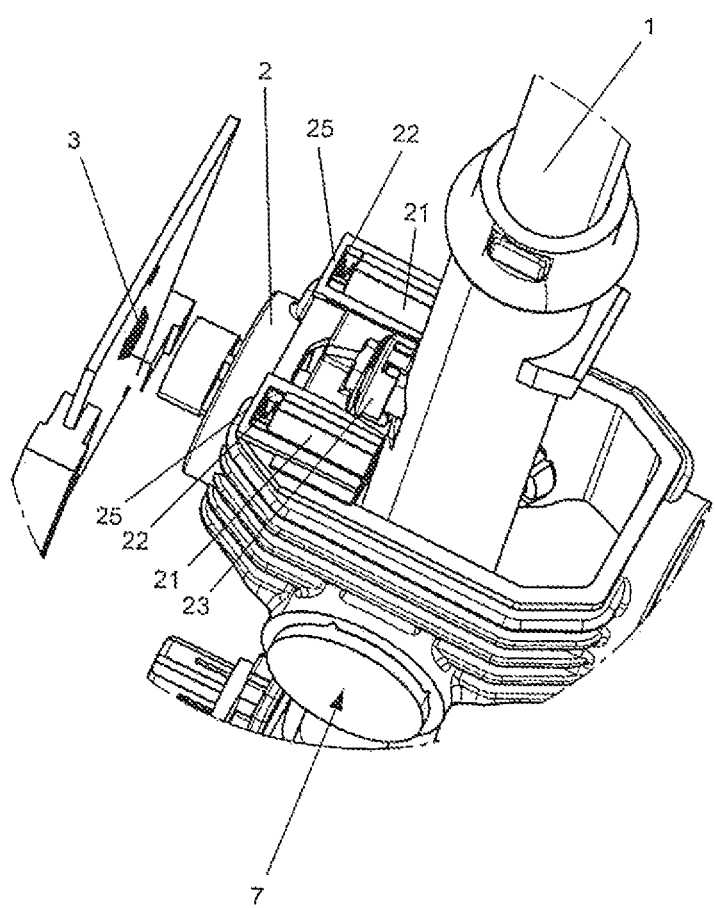
FIG. 5 another embodiment of the device according to the invention, in a perspective view with a gearshift lever.

An embodiment of the invention will be described below. FIG. 1 shows a possible embodiment of a device according to the invention for detecting the position of a gearshift lever 1, whereby the gearshift lever 1 is in a normal position 13, that is to say, in a position for normal driving operation. FIG. 2 shows the corresponding depiction for the gearshift lever 1, which is in a deflected position 14.

The gearshift lever 1 is installed in a shifting link (not shown here) and it serves to select different gears. The shifting link can provide a sequential arrangement of the various gears and it can have a second gearshift gate or shift gate.

The gearshift lever 1 is mounted in a bearing frame so as to pivot in two directions. When the selector lever 1 makes a tilting movement around the tilting axis 7 in the direction crosswise to the vehicle, the function of the gear can be switched over from a shift gate function for shifting the gears (P, N, R, D) to a touch shift gate function or vice versa so that the individual gears can be upshifted or downshifted by hand. A movement of the gearshift lever 1 when it is in the touch shift gate function requires pivoting around a pivoting axis 12 in the lengthwise direction of the vehicle. As an alternative, it can also be provided that the functions can be actuated in the corresponding opposite direction relative to the vehicle.

In order to determine the position of the gearshift lever 1, at least one signal transmitter 2 and at least one signal receiver 3 are provided. In FIGS. 1 and 2, there is shown an embodiment with one signal transmitter 2 and one signal receiver 3. In the embodiment chosen here, the signal transmitter 2 is configured as a permanent magnet and the signal receiver 3 is configured as a Hall sensor that makes it possible to measure the magnetic field of the magnet 2. Of course, the signal transmitter can also be configured, for instance, as an electromagnet.

The magnet 2 is accommodated in a receptacle configured as a cage 6 that is installed so that it can move in a linear guide 4 of the device 10. The linear guide 4 is arranged in a housing 20 of the gearshift lever 1. The cage 6 is operatively connected to an actuation element 5 that is articulated onto the gearshift lever 1.

Moving the gearshift lever 1 in order to select a gear requires pivoting around a tilting axis 7 or pivoting axis 12. Since the magnet 2 arranged in the cage 6 is coupled to the actuation element 5, the magnet 2 is moved around the tilting axis 7 in a linear guide 4 when the gearshift lever 1 is tilted. As a result, the distance between the magnet 2 and the Hall sensor 3 is changed. The magnetic field originating from the magnet 2 moves linearly together with the magnet 2. The Hall sensor 3 registers this change in the magnetic field, as a result of which the position of the gearshift lever 1 can be determined reliably and precisely.

In case of a diametrical magnetization of the magnet 2, owing to the pair-wise arrangement of the north and south poles of the magnet 2 in the direction of the translatory movement axis, the magnetic field originating from the magnet 2 is stronger in the direction of the linear movement than, for example, in case of a movement along an arc of a circle, as is the case with the prior-art devices.

When the gearshift lever 1 is moved along the pivoting axis 12, the magnet 2 is pivoted or executes a rotational movement and, as a result of this movement, the magnetic field originating from the magnet 2 also pivots together with the magnet 2.

In addition, it is possible to have not only a movement of the gearshift lever 1 in the direction crosswise to the vehicle but also a pivoting movement of the selector lever 1 around the pivoting axis 12, in the example chosen here, for example, in the lengthwise direction of the vehicle. When the selector lever 1 pivots around the pivoting axis 12, the magnet 2 and the magnetic field originating from the magnet 2 move along an arc of a circle. The Hall sensor 3 registers this change as well. As a result, the position of the gearshift lever 1 can be precisely determined.

According to the invention, in the case of more complex movements of the gearshift lever 1, it is also conceivable to pivot it around the tilting axis 7 as well as around the pivoting axis 12. These movements also change the magnetic field originating from the magnet 2 and this change is registered by the Hall sensor, as a result of which the position of the gearshift lever 1 can be unambiguously determined.

At least one bearing 15 is provided in order to achieve a smooth tilting movement of the gearshift lever 1 around the pivoting axis 12. Preferably, the selector lever 1 is fitted with two bearings 15, 16 in order to allow a movement along the pivoting axis 12. At least the one bearing 15 is formed by the bearing of the cage 6.

As can be seen in FIGS. 3 and 4, the stops 8 and 9 are provided in the housing of the device 10, and they protect the device against damage due to improper use of the gearshift lever 1. Moreover, resilient elements 17 can be provided in the cage 6 in order to securely hold the magnet 2 and to likewise provide protection against mechanical overloads due to overly vigorous or improper movements of the gearshift lever 1.

FIGS. 3 and 4 likewise show the fastening part 5 having two U-shaped cutouts that are arranged at approximately 90° relative to each other. In an assembly position with the U-shaped section open towards the top, the fastening part 5 is operatively connected to the gearshift lever 1 via a catch 19. The other U-shaped section of the fastening part 5 is operatively connected to a bolt 18 that constitutes the tilting axis 7. Thanks to this connection, it is achieved that the fastening part 5 with the magnet 2 converts the tilting movement of the gearshift lever 1 into a linear movement of the cage 6. The fastening part 5 is articulated so that it can move on the gearshift lever 1.

FIG. 3 shows the position of the gearshift lever 1 for changing the gears in the shift gate function. FIG. 4 shows the position of the gearshift lever 1 in the touch shift gate function for upshifting and downshifting the gears.

A movement of the gearshift lever 1 around the tilting axis 7 effectuates a rotation of the fastening part 5 around this axis 7, so that, as a result, the cage 6 arranged on the fastening part 5 is moved linearly in the linear guide 4. This varies the distance between the magnet 2 and the Hall sensor 3, as a result of which a precise determination of the position of the gearshift lever 1 is possible.

Figure 6:
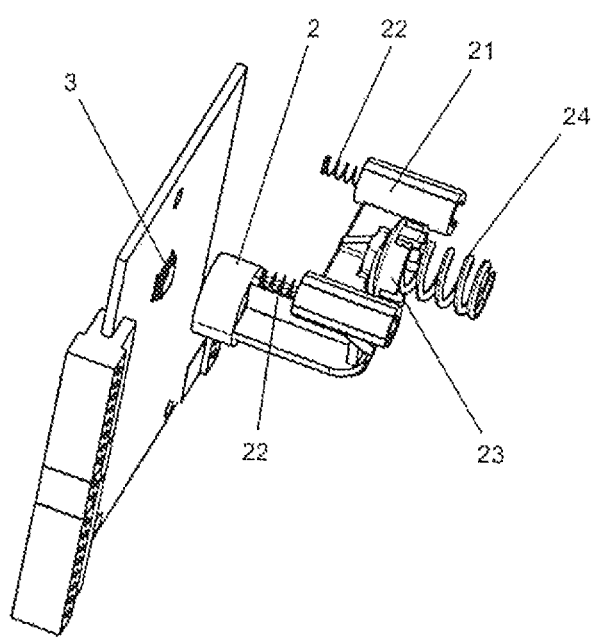
FIG. 6 a detailed view according to the embodiment of FIG. 5.

FIGS. 5 and 6 show an alternative embodiment of the invention. The magnet 2 is arranged on a carriage 21 that is installed so that it can move in a linear guide 25 of the device 10. The carriage 21 is articulated on the gearshift lever 1 via a cam 23 that is spring-loaded by a spring 24.

A movement of the gearshift lever 1 for purposes of selecting a gear requires a tilting of the lever 1 around the tilting axis 7. Since the magnet 2 that is arranged on the carriage 21 is coupled to the gearshift lever 1 via the cam, the magnet 2 is moved via the linear guide 25 of the carriage 21. The Hall sensor 3 registers this distance change between the magnet 2 and the sensor 3, so that the position of the gearshift lever 1 is determined reliably and precisely.

The springs 22 and 24 arranged in the linear guide 25 support the carriage 21 on the housing of the linear guide 25 and they provide protection against mechanical overloads due to overly vigorous or improper movements of the gearshift lever 1.

Figure 7:
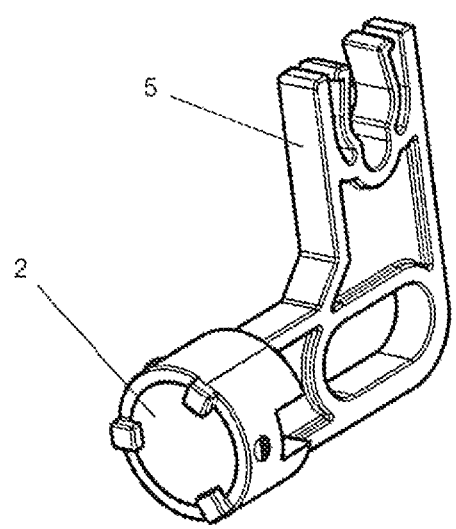
FIG. 7 a detailed view of the actuation element according to an alternative embodiment.

FIG. 7 shows an alternative embodiment according to which the signal transmitter 2 is integrated into the actuation element 5. For example, the signal transmitter 2 can be injection-molded onto the actuation element 5 or else part of the actuation element 5 can be injection-molded around it.

LIST OF REFERENCE NUMERALS

1 gearshift lever
2 signal transmitter
3 signal receiver
4 linear guide 5 actuation element
6 receptacle or cage
7 tilting axis
8 stop
9 stop
10 device
11 cylinder axis
12 pivoting axis
13 normal position
14 deflected position
15 bearing
16 bearing
17 resilient element
18 bolt
19 catch
20 housing
21 carriage
22 carriage spring
23 cam
24 cam spring
25 linear guide

The invention claimed is:

1. A device (10) for detecting a position of a gearshift lever (1) that serves to select a gear setting of a motor vehicle, consisting essentially of:
   a receptacle (6) with one or more outer walls defining a cylindrical configuration with a cylinder axis (11) and having a receptacle cylindrical inner volume that is interior of said one or more outer walls,
   one signal transmitter (2) installed on the gearshift lever (1) and accommodated inside the cylindrical inner volume of the receptacle (6), wherein the gearshift lever (1) has a pivoting axis (12) and a tilting axis (7), wherein the cylinder axis (11) coincides with the pivoting axis (12) for a pivoting movement of the gearshift lever (1) in order to allow a tilting movement to be made perpendicular to the tilting axis (7) of the gearshift lever (1), and wherein the receptacle (6) is movable linearly in a linear guide (4);
   an actuation element (5) to transmit the movement of the gearshift lever (1) to the signal transmitter (2), wherein the signal transmitter (2) is operatively connected to said actuation element (5), and wherein said actuation element (5) engages with the gearshift lever (1) outside of its tilting axis (7); and
   one signal receiver (3) installed at a distance from the signal transmitter (2), wherein positions of the signal transmitter (2) relative to the signal receiver (3) differ in different selectable gears, so that when the gearshift lever (1) is actuated to switch over from a shift gate function to a touch shift gate function or vice versa, the signal transmitter (2) only executes a translatory movement relative to the signal receiver (3).

2. The device (10) according to claim 1, wherein the signal transmitter is installed so that it is movable in the linear guide (4).

3. The device (10) according to claim 1, wherein linear movement of the signal transmitter (2) is limited by two stops (8, 9).

4. The device (10) according to claim 1, wherein the signal transmitter (2) is resiliently accommodated in the receptacle (6).

5. The device (10) according to claim 1, wherein the gearshift lever (1) further comprises at least one bearing (15) in order to allow the tilting movement of the gearshift lever (1) perpendicular to the tilting axis (7).

6. The device (10) according to claim 5, wherein the at least one bearing (15) is associated with the receptacle (6).

7. The device (10) according to claim 1, wherein the signal transmitter (2) is injection-molded onto the actuation element (5) or integrated into the actuation element (5).

8. A motor vehicle, comprising: the device (10) according to claim 1.

9. The device (10) according to claim 1, wherein the receptacle (6) is a cage that has outside wall components spaced about the cylinder axis to define the receptacle inner volume interior to said outside wall components.

10. A device for detecting positions of a gearshift lever of a motor vehicle, consisting essentially of:
    a linear guide;
    a cage receptacle with a cylindrical configuration that defines a cylinder axis and has outside wall components spaced about the cylinder axis to define a cage receptacle inner volume interior to said outside wall components;
    one signal transmitter accommodated inside the cage receptacle inner volume, wherein said cage receptacle is movable linearly in the linear guide arranged on the gearshift lever so that said signal transmitter is linearly movable in the linear guide;
    an actuation element to transmit a movement of the gearshift lever to the signal transmitter, wherein the signal transmitter is operatively connected to said actuation element; and
    one signal receiver installed at a distance from the signal transmitter,
    wherein the gearshift lever has a pivoting axis and a tilting axis, and wherein the cylinder axis coincides with the pivoting axis for a pivoting movement of the gearshift lever in order to allow a tilting movement to be made perpendicular to the tilting axis of the gearshift lever,
    wherein said actuation element engages with the gearshift lever outside of its tilting axis, and
    wherein a position of the signal transmitter relative to the signal receiver differs in different selectable gears, and when the gearshift lever is actuated to switch from a shift gate function to a touch shift gate function, the signal transmitter only moves linearly in the linear guide closer to or farther from the signal receiver.

* * * * *